United States Patent
Biskeborn et al.

(10) Patent No.: US 9,734,851 B2
(45) Date of Patent: *Aug. 15, 2017

(54) MONITORING HEAD WEAR

(71) Applicant: International Business Machines Corporation, Armonk, NY (US)

(72) Inventors: Robert G. Biskeborn, Hollister, CA (US); Jason Liang, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/437,732

(22) Filed: Feb. 21, 2017

(65) Prior Publication Data

US 2017/0154644 A1 Jun. 1, 2017

Related U.S. Application Data

(63) Continuation of application No. 15/163,812, filed on May 25, 2016, now Pat. No. 9,607,636, which is a continuation of application No. 15/041,114, filed on Feb. 11, 2016, now Pat. No. 9,418,686, which is a continuation of application No. 14/953,494, filed on Nov. 30, 2015, now Pat. No. 9,576,599.

(51) Int. Cl.
| | |
|---|---|
| *G11B 5/09* | (2006.01) |
| *G11B 5/455* | (2006.01) |
| *G11B 5/41* | (2006.01) |
| *G11B 5/008* | (2006.01) |

(52) U.S. Cl.
CPC .......... *G11B 5/455* (2013.01); *G11B 5/00813* (2013.01); *G11B 5/41* (2013.01)

(58) Field of Classification Search
None
See application file for complete search history.

(56) References Cited

U.S. PATENT DOCUMENTS

| | | |
|---|---|---|
| 3,947,875 A | 3/1976 | Bull et al. |
| 4,777,544 A | 10/1988 | Brown et al. |
| 4,841,389 A | 6/1989 | Hoyt et al. |
| 5,325,242 A | 6/1994 | Fukuchi et al. |
| 5,729,133 A | 3/1998 | Sakai et al. |
| 6,191,901 B1 | 2/2001 | Carlson et al. |
| 6,288,856 B1 | 9/2001 | Ottesen et al. |
| 6,359,433 B1 | 3/2002 | Gillis et al. |
| 6,657,430 B2 | 12/2003 | Sakai et al. |
| 6,765,738 B1 | 7/2004 | Kamatani et al. |
| 7,016,131 B2 | 3/2006 | Liu et al. |
| 7,301,719 B1 | 11/2007 | Chen et al. |
| 7,889,448 B2 | 2/2011 | Lu |
| 8,570,678 B2 | 10/2013 | Brong et al. |

(Continued)

OTHER PUBLICATIONS

Biskeborn et al., "Monitoring Head Wear", U.S. Appl. No. 15/163,812, filed May 25, 2016, 23 pages.

(Continued)

*Primary Examiner* — Peter Vincent Agustin
(74) *Attorney, Agent, or Firm* — James H. Mayfield

(57) ABSTRACT

A computer system for monitoring head wear includes reading from a cartridge a high frequency pattern and a low frequency pattern, determining a first read amplitude corresponding to the high frequency pattern and a second read amplitude corresponding to the low frequency pattern, and determining a head wear metric according to the first read amplitude and the second read amplitude.

1 Claim, 4 Drawing Sheets

(56) References Cited

U.S. PATENT DOCUMENTS

| | | |
|---|---|---|
| 8,699,169 B2 | 4/2014 | Biskeborn |
| 9,418,686 B1 | 8/2016 | Biskeborn et al. |
| 9,576,599 B1 | 2/2017 | Biskeborn et al. |
| 2004/0085670 A1 | 5/2004 | Li et al. |
| 2009/0029188 A1 | 1/2009 | Wallash et al. |
| 2013/0128371 A1 | 5/2013 | Brong et al. |
| 2013/0222942 A1 | 8/2013 | Biskeborn |

OTHER PUBLICATIONS

IBM Appendix P, list of patents and patent applications treated as related, Feb. 21, 2017, 2 pages.

MONITORING HEAD WEAR

BACKGROUND OF THE INVENTION

The present invention relates generally to magnetic tape data storage, and more specifically, to monitoring the condition of tape heads.

In the field of magnetic tape data storage, tape heads are a type of transducer used to convert electrical signals to magnetic fluctuations and vice versa. Tape heads may be used to read, write, and/or erase information to/from magnetic tape storage. Over time, tape drive operation may wear down a tape head, leading to higher error rates and even drive failure. One way to monitor head wear is to gather data on the head-to-tape spacing.

SUMMARY

As disclosed herein, a computer system for monitoring head wear includes reading from a cartridge a high frequency pattern and a low frequency pattern, determining a first read amplitude corresponding to the high frequency pattern and a second read amplitude corresponding to the low frequency pattern, and determining a head wear metric according to the first read amplitude and the second read amplitude.

DETAILED DESCRIPTION

Embodiments of the present invention relate generally to magnetic tape data storage, and more specifically, to monitoring the condition of tape heads. Over time and depending on usage, tape heads may deteriorate, resulting in a higher read/write error rate, data loss, and even drive failure. Currently, there is no means of measuring head-to-tape spacing while operating the drive. The head-to-tape spacing can indicate the degree to which a tape head has worn down. Therefore, it is desirable to come up with a metric for measuring and monitoring the condition of a tape head.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter. The present invention will now be described in detail with reference to the figures.

Figure 1:
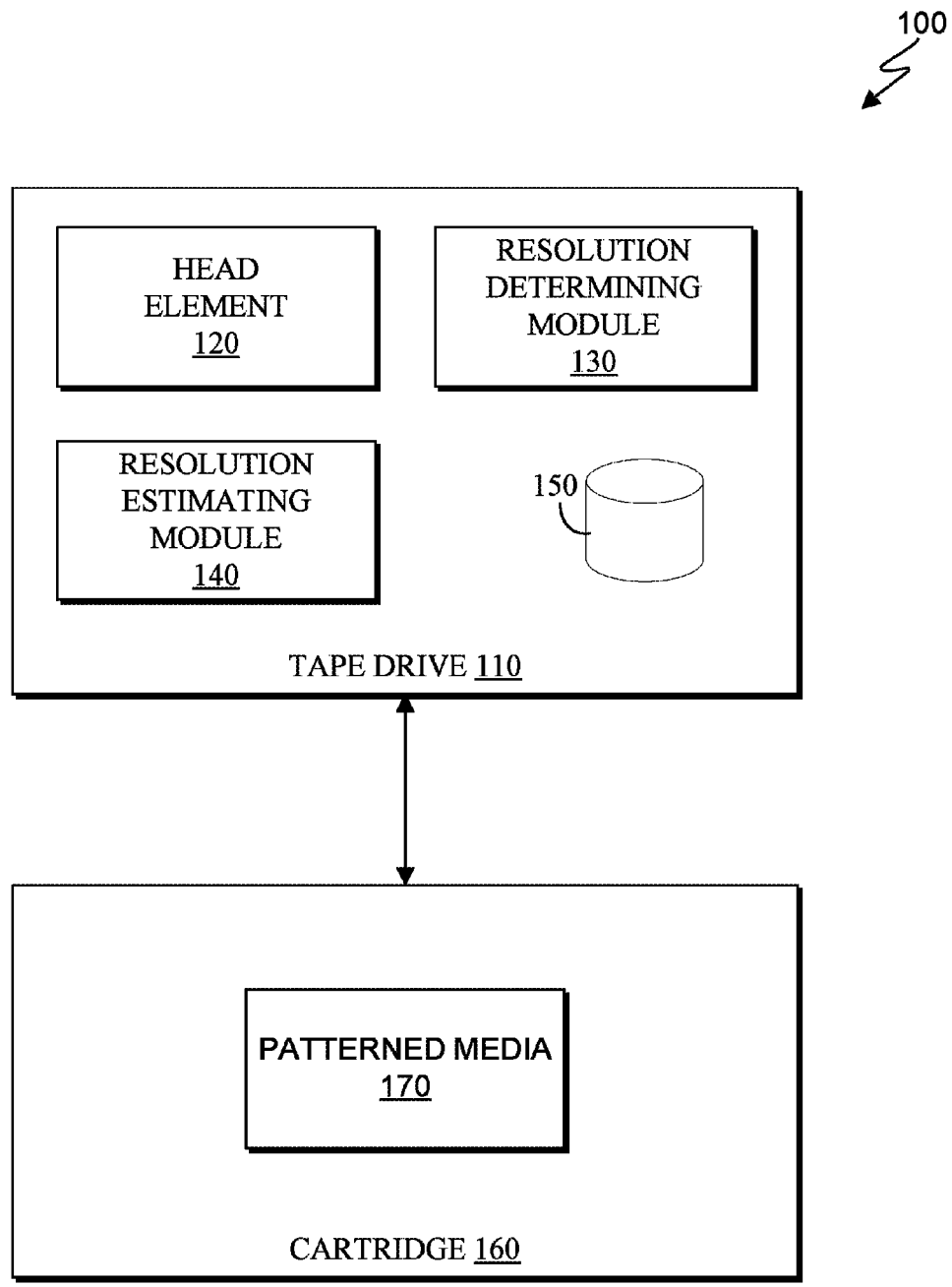
FIG. 1 is a block diagram depicting one embodiment of a head monitoring system in accordance with the present invention.

FIG. 1 is a block diagram depicting one embodiment of a head monitoring system 100 in accordance with the present invention. As depicted, the head monitoring system 100 includes tape drive 110, head element 120, resolution determining module 130, resolution estimating module 140, storage 150, cartridge 160, and patterned media 170. The tape drive 110 may read a test pattern provided by the cartridge 160 in order to monitor the condition of the head element 120.

Tape drive 110 may be a data storage device that reads and writes data on a magnetic tape. In some embodiments, a cartridge, such as cartridge 160, must be mechanically inserted into tape drive 110 in order for the tape drive 110 to operate. Tape drive 110 may read and/or write to a cartridge's magnetic tape using head element 120; over time, this action wears down head element 120.

Head element 120 may be any sort of tape head, which is a type of transducer used in tape recorders to convert electrical signals to magnetic fluctuations and vice versa. In some embodiments, the condition of a head element 120 is determined by measuring the head-to-tape spacing in a tape drive 110. Head element 120 may include one or more types of tape heads, such as rotating heads, erase heads, Osbourne heads, and/or any sort of head know to those skilled in the art.

Cartridge 160 may be any sort of cartridge or cassette that is readable by tape drive 100. In some embodiments, cartridge 160 is a cleaning cartridge, which cleans the head element 120 when inserted into tape drive 110. Cartridge 160 may be a cleaning tape or a diagnostic tape. In some embodiments, cartridge 160 is a data tape that is not constantly in use since usage can cause degradation of the cartridge. When cartridge 160 is inserted into tape drive 110, head element 120 may read a test pattern from patterned media 170. Patterned media 170 may contain one or more test patterns. In some embodiments, patterned media 170 is a length of magnetic storage tape upon which test pattern(s) are written. Patterned media 170 may be a transmitting head that transmits test patterns stored elsewhere on cartridge 160 while cartridge 160 simulates playback by a system of gears or a drive belt connects the tape drive 110's motor to a wheel inside the cartridge 160, similar to a cassette tape adaptor.

In some embodiments, each test pattern consists of one or more predetermined low frequency patterns and high frequency patterns. As (or after) the head element 120 reads the test pattern(s), the head element 120 may communicate information to the resolution determining module 130. Resolution determining module 130 may receive information relating to the test pattern(s) and calculate resolution, which is directly related to the head-to-tape spacing. Resolution may be calculated by dividing the amplitude of a high frequency test pattern by the amplitude of a low frequency test pattern according to the equation:

Resolution=Amplitude of high frequency test pattern/Amplitude of low frequency test pattern When the amplitudes of both high- and low-frequency test patterns are the same, then an ideal head will report that the resolution is equal to 1.0; a lower value, such as 0.4, may indicate that there is significant head wear. In some embodiments, resolution determining module 130 receives the values of the amplitudes from the head element 120. As the head element 120 wears over time, the spacing loss increases and thus the head element 120 is unable to read the full extent of the high frequency test pattern's amplitude. Thus, over time, the numerical value of the resolution may decrease.

Resolution estimating module 140 may estimate head wear over time. In some embodiments, resolution estimating module 140 applies statistical techniques to extrapolate the head element 120's future resolution values based on a combination of prior resolution values, time elapsed, and/or tape drive 110 usage. For example, if a head element 120 has a resolution value of 0.9, and then after 1000 hours of tape drive 110 activity, 0.8, resolution estimating module 140 may determine that after another 1000 hours of usage, head element 120's resolution value will be 0.7. Any number of statistical techniques that extrapolate future values based on a history of past values may be employed by resolution estimating module 140, such as linear extrapolation, polynomial extrapolation, conic extrapolation, exponential curve extrapolation, logarithmic extrapolation, and the like. Resolution estimating module 140 may receive past resolution values from storage 150, which stores and shares data regarding the resolution with the rest of head monitoring system 100. In some embodiments, storage 150 receives resolution values from head element 120 and/or resolution determining module 130. Resolution estimating module 140 may also store future resolution values in storage 150.

Figure 2A:
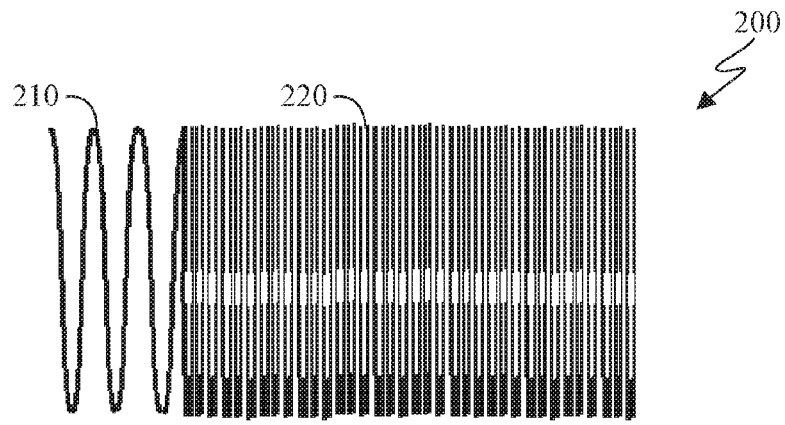
FIGS. 2A-2C depict examples of test patterns in accordance with the present invention.
Figure 2B:
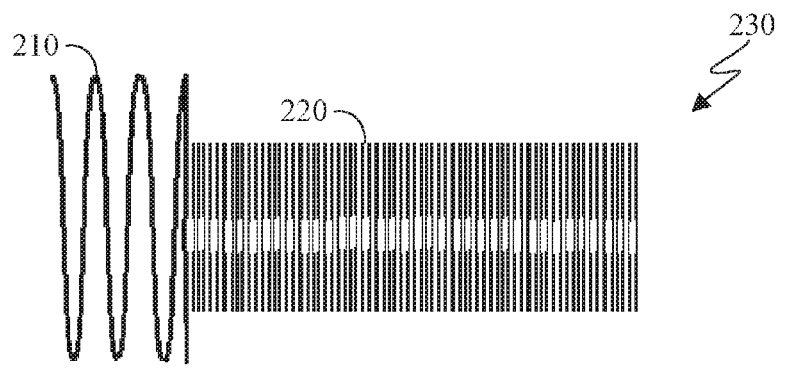
Figure 2C:
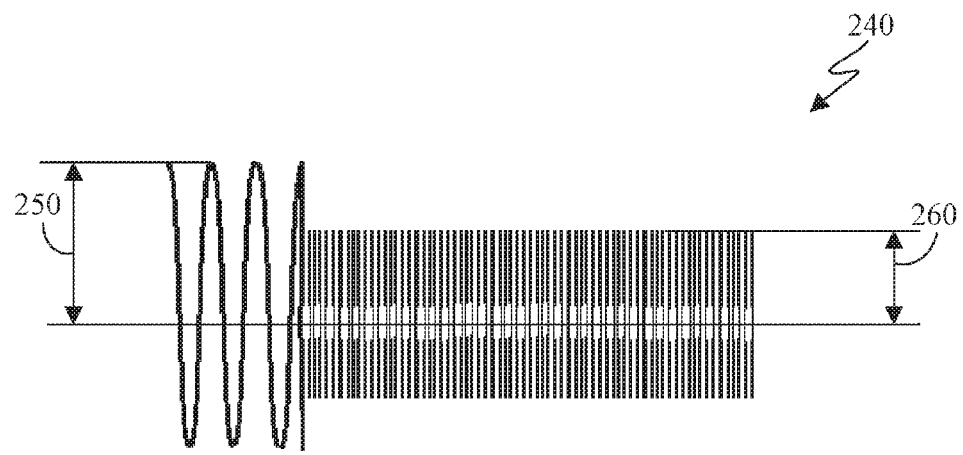

FIGS. 2A-2C depict examples of test patterns 200, 230, and 240 in accordance with the present invention. As depicted, test patterns 200, 230, and 240 include a low frequency pattern 210, high frequency pattern 220, low frequency pattern amplitude 250, and high frequency pattern amplitude 260. Test pattern 200 may represent a pattern as read by a newer head, whereas test patterns 230 and 240 may represent patterns read by a head experiencing head wear.

FIG. 2A depicts an example of a waveform read by a head with little to no spacing loss (head wear), whereas FIG. 2B depicts a waveform as read by a head with large spacing loss. As a head becomes worn, the ability to read a high frequency pattern 220 is impacted before the ability to read a low frequency pattern 210. In particular, the amplitude value of the high frequency pattern 220 is affected because the worn head is unable to read the full extents of the test pattern's amplitude.

Resolution may be calculated by dividing the high frequency pattern amplitude 260 by the low frequency pattern amplitude 250. By using empirical evidence, resolution values may be meaningfully correlated with head wear. In some embodiments, the high frequency pattern 220 has a frequency four times greater than the low frequency pattern 210. This frequency difference can be achieved if the period at which the patterns are written is 2 T for the high frequency and 8 T for the low frequency (as period is inversely proportional to frequency). In such embodiments, it may be determined that tape drives start their life having a resolution of 0.6-0.8, and that a resolution of 0.4 or lower can result in permanent read/write errors or outright head failure.

Figure 3:
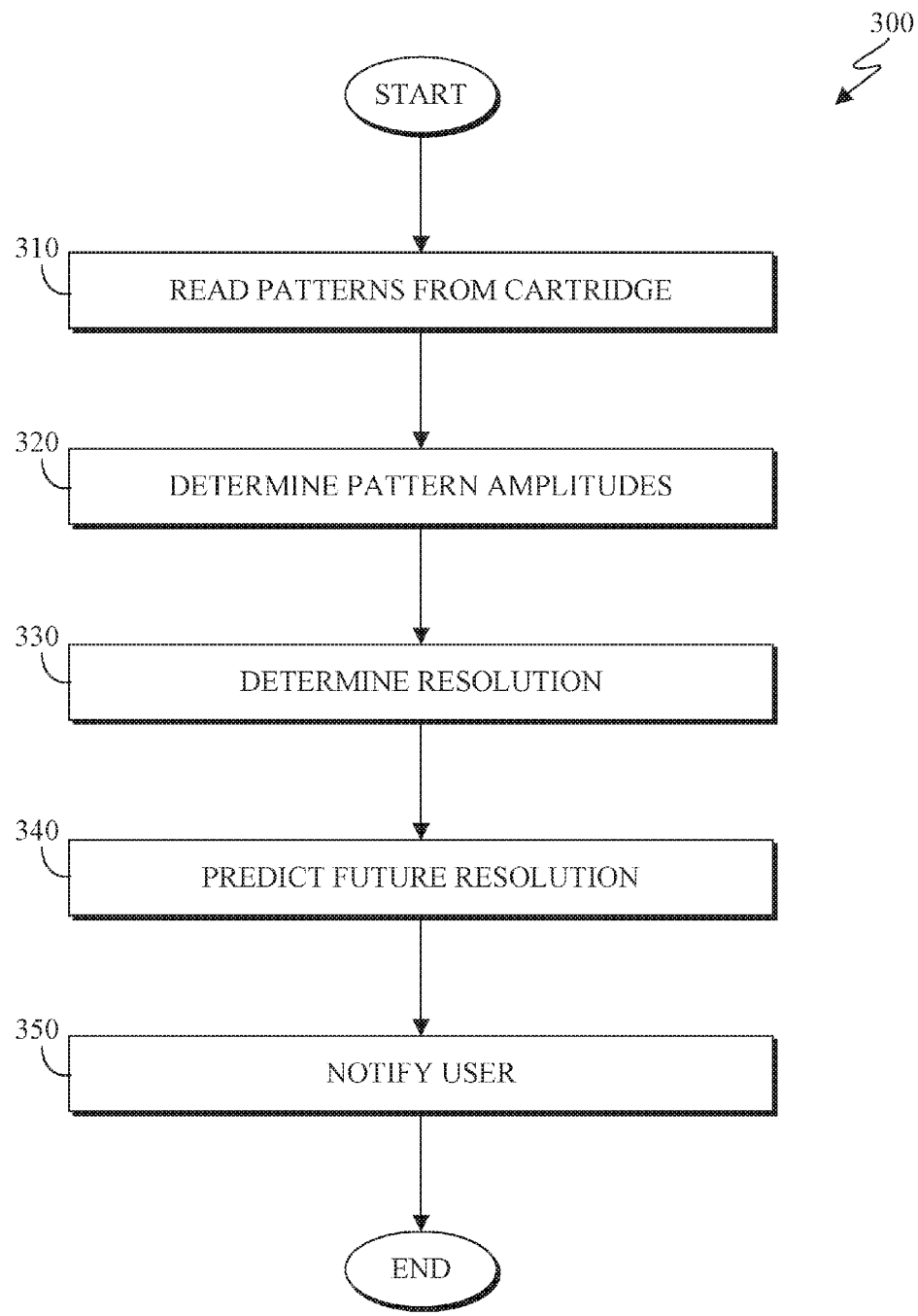
FIG. 3 is a flowchart depicting one embodiment of a head wear monitoring method in accordance with the present invention.

FIG. 3 is a flowchart depicting one embodiment of a head wear monitoring method 300 in accordance with the present invention. As depicted, the head wear monitoring method 300 includes reading (310) patterns, determining (320) pattern amplitudes, determining (330) resolution, predicting (340) future resolution, and notifying (350) a user. By reading known patterns from a test cartridge, the condition of a drive head may be tracked over time, allowing a user to foresee and avoid drive failure.

Reading (310) patterns from a cartridge may include reading test patterns from a cassette or cartridge. In some embodiments, the test patterns are encoded in the patterned media 170 of cartridge 160. Read patterns may appear as the patterns depicted in FIGS. 2A-2C. Determining (320) pattern amplitudes may include measuring the distance from a center line of a waveform to a peak of a waveform, as depicted by amplitudes 250 and 260 in FIG. 2C. In some embodiments, the amplitude determining operation 320 is performed by head element 120 and/or resolution determining module 130. The pattern reading operation 310 may be performed while a tape drive is cleaned if the cartridge 160 is a cleaning cassette.

Determining (330) a resolution value may include dividing the amplitude of a high frequency pattern by the amplitude of a low frequency test pattern. In some embodiments, the resolution determining operation 330 is performed by the resolution determining module 130. Resolution values corresponding to a head element may be tracked over time and stored, e.g., in storage 150. For a test pattern having a high frequency pattern of four times the frequency of a low frequency pattern, a resolution of between 0.6 and 0.8 may translate to a functioning tape head, whereas a resolution of 0.4 or below may indicate that the tape head is approaching its end of life.

The resolution value may be calculated before and after a cleaning cycle in order to determine the efficacy of the cleaning cycle. A cleaning cycle may be requested by the tape drive due to data tapes leaving deposits on the head that result in sudden poor error rates. Before the cleaning cycle is initiated, a quick snapshot of the head resolution may be captured. At the end of the cycle, the resolution may be measured again. If the resolution values taken before and after cleaning fail to show a noticeable change, it may be concluded that the cleaning was ineffective, or that a new cleaning cartridge ought to be used. Alternatively, if the resolution value after cleaning is higher than the resolution value before cleaning, the cleaning cycle may be determined to be successful. In some embodiments, additional cleaning cycles may be requested until the pre- and post-cleaning resolution values stabilize. This may indicate that the cleaning tape was effective in removing the deposits on the head to the best of its ability.

Predicting (340) future resolution values may include predicting the resolution of a tape at some point in the future, either as measured by time elapsed, or usage time of the tape drive. In some embodiments, the resolution estimating module 140 is able to predict future resolutions by drawing on resolution data stored in storage 150 and extrapolating.

Notifying (350) a user may include indicating to a user the status of the tape head. In some embodiments, the resolution value of a tape head may be communicated to a user. The user may be alerted as to future resolution values and/or when the head monitoring system 100 predicts that the tape head will reach a certain condition or fail. The user may be notified of the approximate number of usable hours and minutes left in a particular tape head. In some embodiments, the user is notified that the current resolution is too low to perform a particular back-up without hazarding the risk of the head wearing out before the back-up is successfully completed. The drive may be sequestered, or a warning may be posted to the user asking if the user wants to proceed with a back-up despite a risk of tape head failure before successful completion of the back-up.

Figure 4:
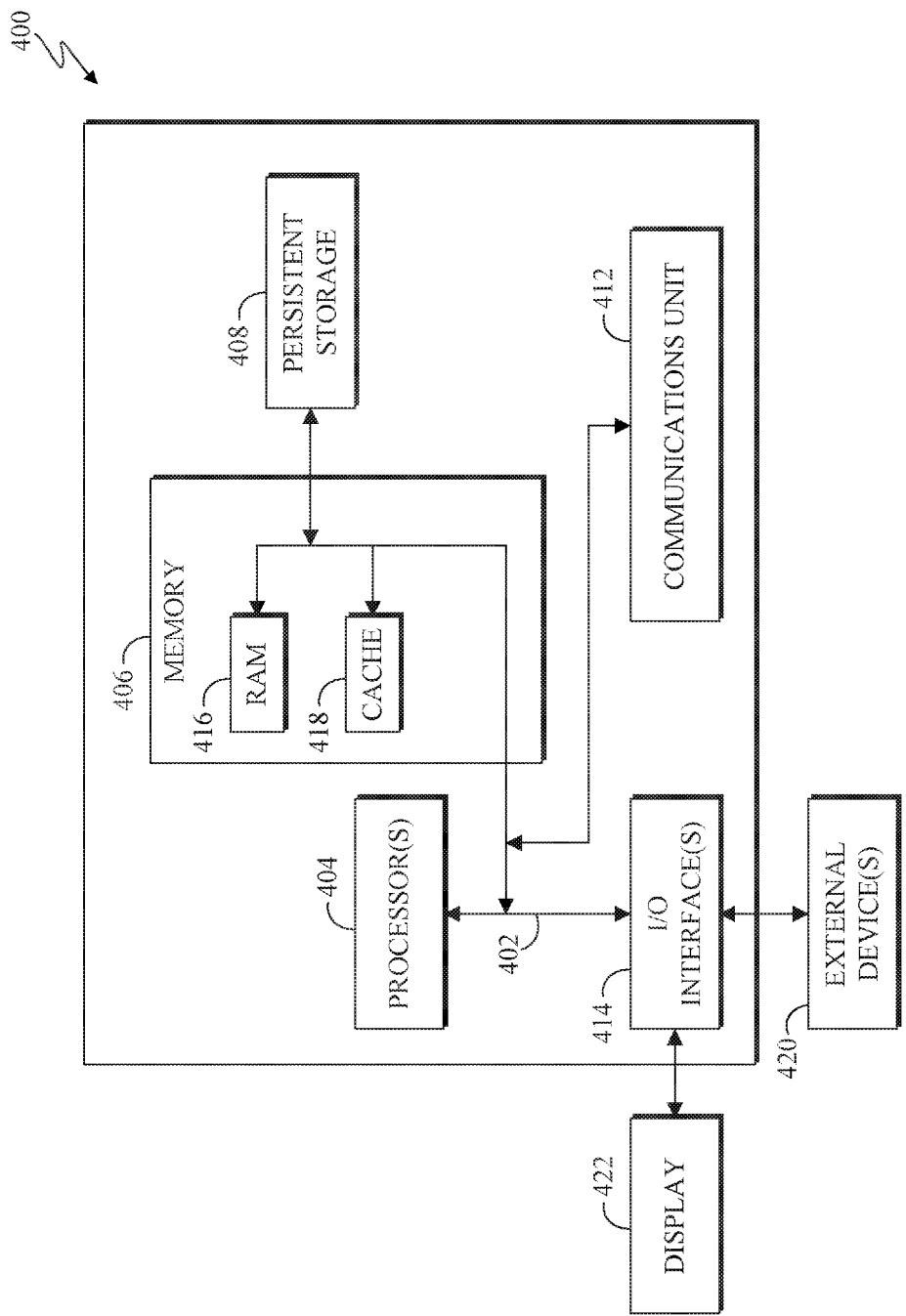
FIG. 4 is a block diagram depicting one example of a computing apparatus (i.e., computer) suitable for executing the methods disclosed herein.

FIG. 4 is a block diagram depicting components of a computer 400 suitable for executing the methods disclosed herein. It should be appreciated that FIG. 4 provides only an illustration of one embodiment and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In the depicted embodiment, memory 406 includes random access memory (RAM) 416 and cache memory 418. In general, memory 406 can include any suitable volatile or non-volatile computer readable storage media.

One or more programs may be stored in persistent storage 408 for execution by one or more of the respective computer processors 404 via one or more memories of memory 406. The persistent storage 408 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 408 via I/O interface(s) 414. I/O interface(s) 414 may also connect to a display 422. Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for monitoring head wear, the computer system comprising:
    one or more computer processors;
    one or more computer readable storage media;
    program instructions stored therein for execution by at least one of the one or more computer processors, the program instructions comprising instructions for:
        reading from a cartridge a first pattern and a second pattern, wherein the first pattern is a higher frequency pattern and the second pattern is a lower frequency pattern, and wherein the higher frequency pattern has a frequency that is at least four times greater than a frequency of the lower frequency pattern;
        determining a first read amplitude corresponding to the first pattern and a second read amplitude corresponding to the second pattern;
        determining a head wear metric according to the first read amplitude and the second read amplitude;
        determining a future head wear metric according to a head wear metric history;
        determining a first resolution before a cleaning cycle, wherein the first resolution is determined by dividing the first read amplitude by the second read amplitude;
        determining a second resolution after the cleaning cycle, wherein the second resolution is determined by dividing the first read amplitude by the second read amplitude;
        comparing the first resolution and the second resolution;
        notifying a user that the head wear metric is between a resolution of 0.6 and 0.8 in response to determining that the resolution is between 0.6 and 0.8, wherein the resolution is determined by dividing the first read amplitude by the second read amplitude;
        notifying a user that the head wear metric is at or below a resolution of 0.4 in response to determining that the resolution is below 0.4; and
        notifying a user of the head wear metric.

* * * * *